(12) United States Patent
Nishioka et al.

(10) Patent No.: US 8,959,909 B2
(45) Date of Patent: Feb. 24, 2015

(54) VEHICLE BRAKE SYSTEM

(75) Inventors: Takashi Nishioka, Saitama (JP); Satoshi Matsushita, Saitama (JP); Hidetoshi Kobori, Saitama (JP); Naoto Ohkubo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 621 days.

(21) Appl. No.: 13/315,648

(22) Filed: Dec. 9, 2011

(65) Prior Publication Data

US 2012/0151914 A1 Jun. 21, 2012

(30) Foreign Application Priority Data

Dec. 20, 2010 (JP) ................. 2010-283114

(51) Int. Cl.
*B60T 7/04* (2006.01)
*B60T 13/74* (2006.01)

(52) U.S. Cl.
CPC ............... *B60T 7/042* (2013.01); *B60T 13/745* (2013.01)
USPC ............................................... 60/545

(58) Field of Classification Search
USPC ............................................... 60/545
See application file for complete search history.

(56) References Cited

U.S. PATENT DOCUMENTS

| 7,966,114 | B2 * | 6/2011 | Yamazaki | 701/41 |
| 8,579,386 | B2 * | 11/2013 | Hatano | 303/116.2 |
| 8,583,337 | B2 * | 11/2013 | Matsushita | 701/70 |
| 2012/0062023 | A1 * | 3/2012 | Ohkubo et al. | 303/3 |

FOREIGN PATENT DOCUMENTS

| JP | 2000-085562 A | 3/2000 |
| JP | 2002-067909 A | 3/2002 |
| JP | 2007-331538 A | 12/2007 |
| JP | 2008-143256 A | 6/2008 |
| JP | 2009-227023 A | 10/2009 |
| JP | 2010-070144 A | 4/2010 |
| JP | 2010070144 A * | 4/2010 |
| WO | 2010-064526 A1 | 6/2010 |
| WO | WO 2010064526 A1 * | 6/2010 |
| WO | 2010/119889 A1 | 10/2010 |
| WO | WO 2010119889 A1 * | 10/2010 |
| WO | 2010-143660 A1 | 12/2010 |
| WO | WO 2010143660 A1 * | 12/2010 |

OTHER PUBLICATIONS

Chinese Office Action issued on Jan. 16, 2014 in the corresponding Chinese Patent Application No. 201110443569.1 with English translation thereof.

* cited by examiner

*Primary Examiner* — Thomas E Lazo
(74) *Attorney, Agent, or Firm* — Carrier Blackman & Associates, P.C.; Joseph P. Carrier; William D. Blackman

(57) ABSTRACT

In a brake-by-wire vehicle brake system using a feedback control unit (12a, 12b, 31, 36, 45) for producing a brake fluid pressure according to a brake input, a response restricting unit (26, 39, 48) restricts a response property of the feedback control unit when an extraneous brake fluid control operation is detected. Thereby, the control unit is prevented from excessively reacting to changes in the brake fluid pressure caused by the extraneous brake fluid control operation, and the vehicle brake system can provide a highly responsive property and a resistance to changes in the brake fluid pressure at the same time.

7 Claims, 4 Drawing Sheets

VEHICLE BRAKE SYSTEM

TECHNICAL FIELD

The present invention relates to a vehicle brake system, and in particular to a vehicle brake system using an electric actuator for producing a brake fluid pressure.

BACKGROUND OF THE INVENTION

In electric vehicles and hybrid vehicles, it is a common practice to use the electric motor which is connected to the drive axle of the vehicle as a generator that produces electric power and provides a braking force at the same time when decelerating the vehicle. This is called as regenerative braking. However, the regenerative braking is generally inadequate for providing all of the need for the braking force, and it is common to combine the more conventional hydraulic (friction) braking with the regenerative braking. JP 2008-143256A discloses an electronically controlled brake-by-wire system that controls the hydraulic brake and the regenerative brake in a coordinated manner.

In a brake-by-wire system, a target brake force is set by an input amount given by a depression stroke of the brake pedal (pedal stroke), and the target braking force is distributed between the hydraulic braking and the regenerative braking. The hydraulic braking is based on the use of a motor actuated cylinder which is actuated by an electric motor, and supplies a brake fluid pressure for operating the wheel cylinders.

The ABS (anti-lock brake system) for preventing the locking of wheels at the time of braking is widely used in the existing vehicles, and performs the functions thereof by controlling the brake fluid pressure that is supplied to the wheel cylinders. JP 2007-331538A discloses an ABS system, and such an ABS system can be combined with a brake-by-wire system as an extraneous system that involves an extraneous brake fluid control operation. The VSA (vehicle stability assist) system is another example of systems that are extraneous to the main vehicle brake system but performs the functions thereof by acting upon the brake fluid pressure that is distributed to different wheels.

In the brake-by-wire system, the motor actuated cylinder is operated according to the target brake force or the target brake fluid pressure which is allocated to the hydraulic brake. The control of the brake fluid pressure is typically based either on the cylinder stroke of the motor actuated cylinder or the motor current of the electric motor of the motor actuated cylinder (or the force applied to the piston of the motor actuated cylinder).

When the control process is based on the cylinder stroke, the target cylinder stroke of the motor actuated cylinder is determined according to the target brake fluid pressure by taking into account the loss property of the brake fluid path between the motor actuated cylinder and the wheel cylinder, the cylinder stroke is converted into rotational angle of the electric motor, and the electric motor is operated by a feedback control so as to cause the cylinder stroke to agree with the target cylinder stroke.

When the control process is based on the motor current, the target motor torque is determined according to the target brake fluid pressure by taking into account the specifications or configurations of the motor actuated cylinder and the reduction gear unit of the electric motor, the motor torque is converted into motor current, and the electric motor is operated by a feedback control so as to cause the motor torque to agree with the target motor torque.

When the control process is based on the cylinder stroke, the amount of the brake fluid that is required for producing the target brake fluid pressure is used as the target value. As this target value or the amount of the brake fluid gives the direct measure of the braking force, a high responsiveness can be achieved both in normal braking and in combined braking (combining both the regenerative braking and the hydraulic braking), and the braking force can be produced at a relatively high precision. However, as the computation of the target value based on the cylinder stroke is made on the basis of the fluid loss property, if any fluctuation in the fluid pressure occurs, the actual fluid pressure may excessively overshoot the target fluid pressure, and this may cause the deviation between the target fluid pressure and the actual fluid pressure to persist more than desired. Such fluctuations of fluid pressure may be caused by an extraneous brake fluid control operation performed by an extraneous system based on the use of the brake system such as a ABS, a traction control and other VSA systems.

When the control process is based on the motor current, the motor torque that is required to produce the target fluid pressure is used as the target value so that the actual fluid pressure may be made to agree with the target fluid pressure without relying on an accurate estimation of the fluid loss property. However, the amount of the brake fluid that is required for producing the target fluid pressure is not considered. Therefore, as compared to the case where the control process is based on the cylinder stroke, the responsiveness is lower, and the coordinated control of the normal braking and the regenerative braking may be performed only with a reduced responsiveness.

BRIEF SUMMARY OF THE INVENTION

In view of such problems of the prior art, a primary object of the present invention is to provide a vehicle brake system that can provide a highly responsive property and a resistance to changes in the brake fluid pressure at the same time.

A second object of the present invention is to provide a vehicle brake system which is highly robust against changes in the brake fluid pressure and abnormal conditions of sensors.

According to the present invention, such objects can be accomplished by providing a vehicle brake system, comprising: an input amount sensor for detecting an input amount applied to a brake pedal; a motor actuated cylinder configured to be actuated by an electric motor for producing a brake fluid pressure in dependence on a control input thereof; a wheel cylinder that produces a braking force according to the brake fluid pressure supplied thereto by the motor actuated cylinder; a feedback control unit including a target setting unit for setting a target operation amount of the motor actuated cylinder according to the input amount applied to the brake pedal, an operation amount sensor for detecting an actual operation amount of the motor actuated cylinder and a feedback unit for providing the control input for the motor actuated cylinder so as to minimize a deviation between the target operation amount and the actual operation amount; and a response restricting unit for restricting a response property of the feedback control unit when a prescribed condition is met such as when an extraneous brake fluid control operation is detected.

Thereby, the vehicle brake system demonstrates a highly responsive property under normal condition by performing a feedback control based on the operation amount of the motor actuated cylinder typically consisting of the cylinder stroke thereof, and a high resistance to changes in the fluid loss property or other fluctuations in the brake hydraulic system can be achieved when an extraneous brake fluid control operation typically consisting of a VSA or other vehicle motion control system is detected.

According to a certain aspect of the present invention, the response restricting unit comprises a low pass filter for filtering out a high frequency component from a signal representing the input amount and a switching unit for selectively activating the low pass filter when an extraneous brake fluid control operation is detected.

According to a specific aspect of the present invention, the operation amount of the motor actuated cylinder comprises a motor angle or a motor current.

According to another aspect of the present invention, the feedback control unit comprises a first feedback control unit using a motor angle as the operation amount and a second feedback control unit using a motor current as the operation amount, and the response restricting unit comprise a switching unit for controlling the motor actuated cylinder by using the first feedback control unit when the prescribed condition is not met and the second feedback control unit when the prescribed condition is met.

In this case, when the prescribed condition is met such as when an extraneous brake fluid control operation is detected, the feedback control based on the motor current is performed, and this allows the brake to be operated with a similar impression as that based on the motor angle while providing a reasonable robustness against fluctuations in the brake fluid system.

The extraneous brake fluid control operation may comprise a reduction and/or an increase in the fluid pressure of the wheel cylinder.

The vehicle brake system may further comprise a sensor abnormality detection circuit, the response restricting unit restricting a response property of the feedback control unit when an abnormal condition of a sensor is detected by the sensor abnormality detection circuit, so that the vehicle brake system may be made robust against errors in the sensors for the brake system.

For an improved response and/or stability, the vehicle brake system may further comprise a brake fluid pressure sensor for detecting the brake fluid pressure and a brake fluid pressure compensating unit for compensating the input amount according to the detected brake fluid pressure.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
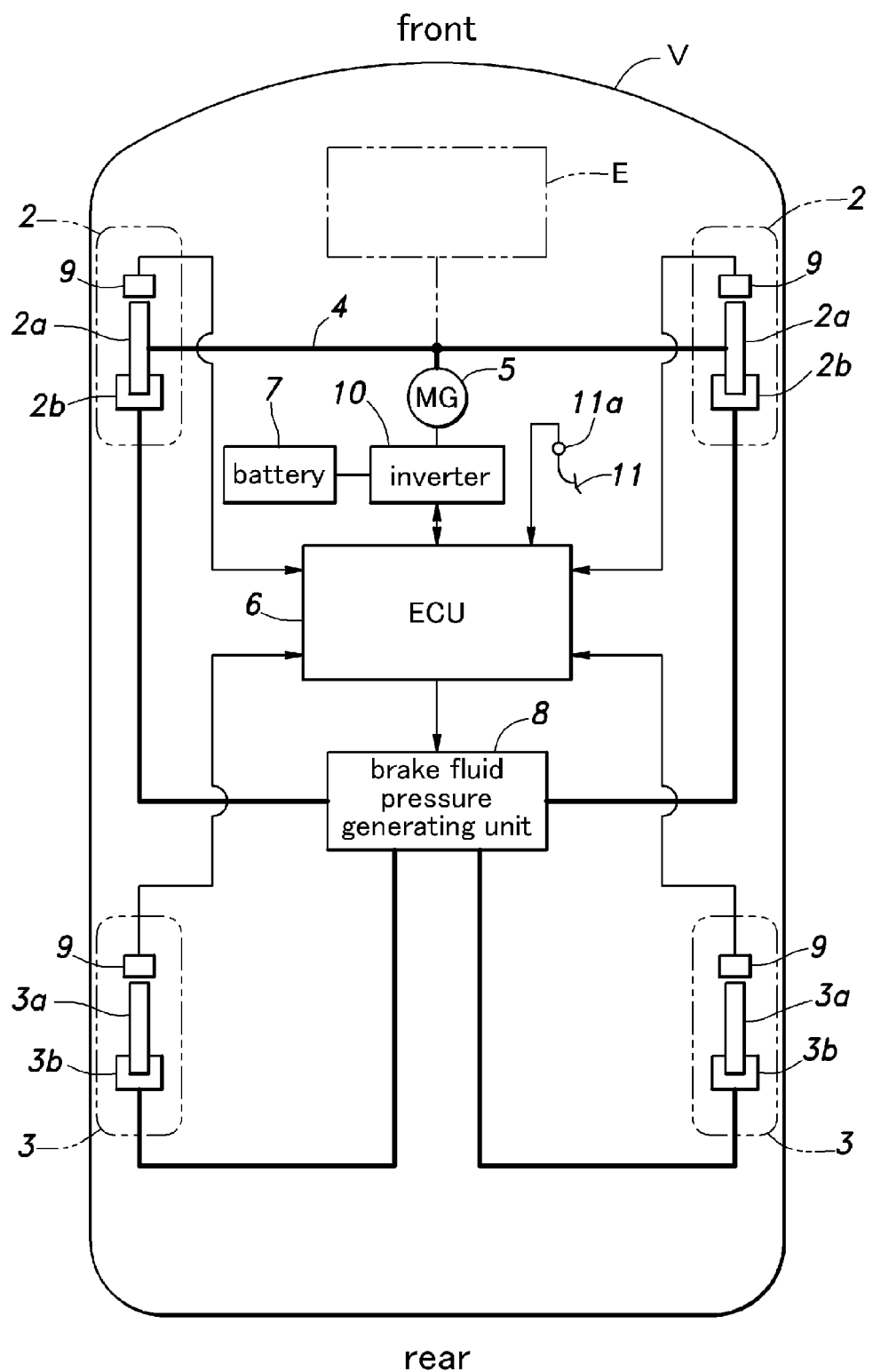
FIG. 1 is a schematic diagram showing a vehicle incorporated with a vehicle brake system embodying the present invention.

FIG. 1 shows a brake system of an electric or hybrid vehicle embodying the present invention. This vehicle V comprises a pair of front wheels 2 located on the front side thereof and a pair of rear wheels 3 located on the rear side thereof. The front wheels 2 are connected to front axles 4 which are in turn connected to a motor/generator 5 in a torque transmitting relationship via a differential gear device (not shown in the drawing).

The motor/generator 5 operates both as an electric motor for propelling the vehicle and a generator for providing a regenerative braking. More specifically, the motor/generator 5 can receive electric power from a rechargeable battery 7 serving as a power source via an inverter 10, and can also supply electric power to (recharge) the battery 7 by converting the kinetic energy into electric power by the regenerative braking.

A control unit (ECU) 6 incorporated with a CPU control circuit performs various control actions for the vehicle V including the distribution of braking force as will be described hereinafter. The control unit 6 is electrically connected to the inverter 10. In the case of an electric vehicle, the structure illustrated in FIG. 1 may be applied as it is, or, alternatively, an additional motor/generator for the rear wheels 3 may be included in the vehicle 1. In the case of a hybrid vehicle, the front axles 4 are additionally connected to the output shaft of an internal combustion engine E indicated by the double-dot chain dot lines in FIG. 1. The illustrated engine E is configured to drive the front wheels, but may also be configured to drive the rear wheels or all of the four wheels.

Each of the front and rear wheels 2, 3 is provided with a per se known disk brake including a disk 2a, 3a integrally attached to the wheel 2, 3 and a caliper incorporated with a wheel cylinder 2b, 3b. The wheel cylinder 2b, 3b is connected to a brake fluid pressure generating unit 8 via a per se known brake tubing. The brake fluid pressure generating unit 8 consists of a hydraulic circuit configured to distribute hydraulic brake pressure to the different wheels and adjust the hydraulic brake pressure level for each wheel.

A wheel speed sensor 9 is provided in association with each wheel 2, 3, and a displacement sensor 11a is provided in association with a brake pedal 11 (that is operated by a vehicle operator) to detect a brake operation amount or a brake depression stroke. The detection signals of the wheel speed sensors 9 and the displacement sensor 11a are forwarded to the control unit 6.

Upon detecting an output signal of the displacement sensor 11 a of the brake pedal 11 becoming greater than zero, the control unit 6 performs a control action for braking. In the illustrated embodiment, the braking action is performed as that of a brake-by-wire system, and includes a regenerative cooperative control combining a regenerative braking and a hydraulic braking.

The brake system 1 of this vehicle V is described in the following with reference to FIG. 2. The brake system 1 consists of a brake-by-wire system that detects the brake operation amount (brake pedal stroke) of the brake pedal 11 by using the stroke sensor 11a (serving as an input amount sensor) and produces a brake fluid pressure according to the detected brake operation amount by using a motor actuated cylinder 13 (serving as a brake fluid pressure generating cylinder) configured to be actuated by an electric servo motor 12.

Figure 2:
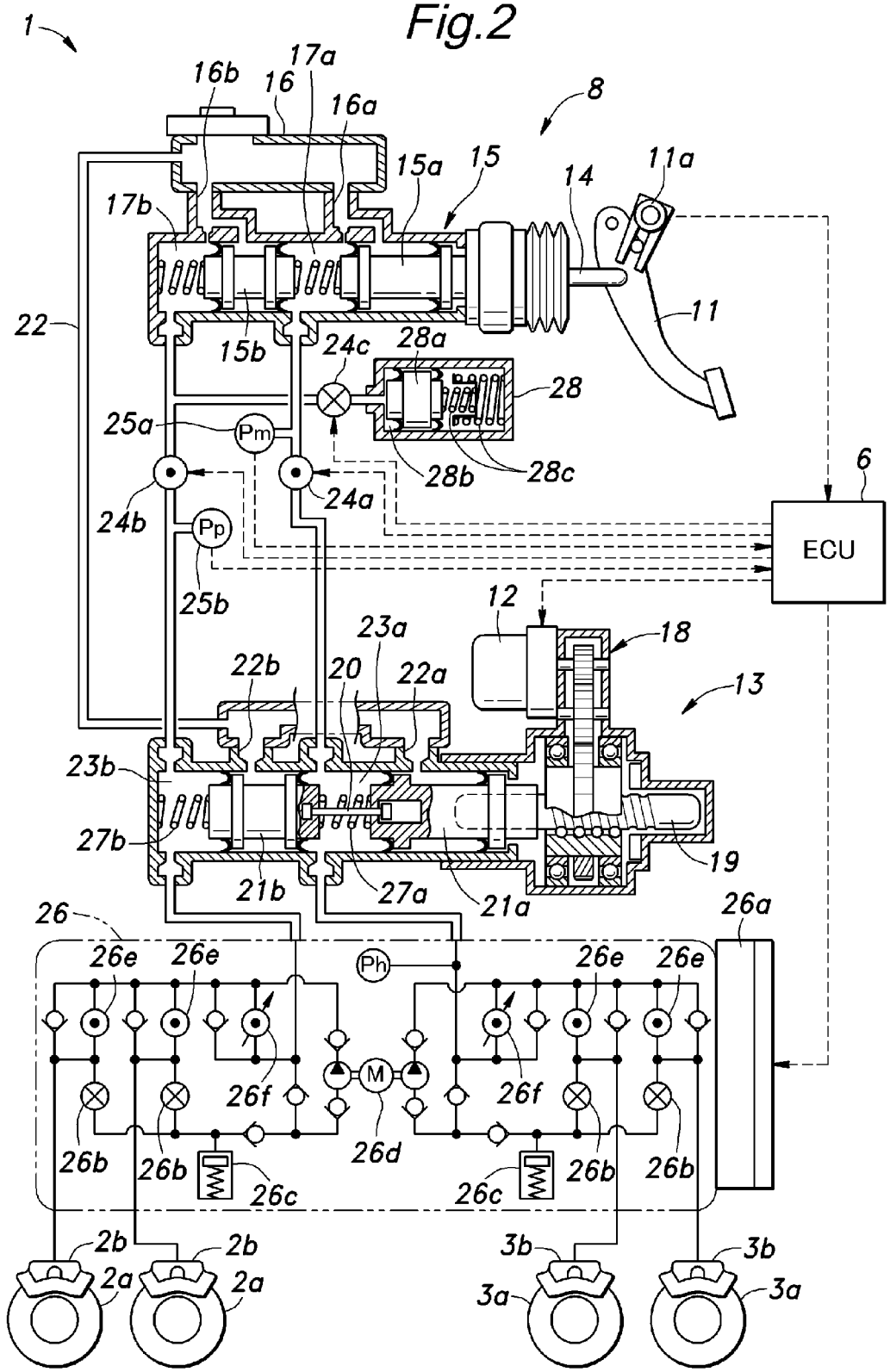
FIG. 2 is a diagram showing the overall structure of the vehicle brake system according to the present invention.

As shown in FIG. 2, an end of a rod 14 is connected to the brake pedal 11 which is in turn pivotally connected to the vehicle body so as to convert the angular movement of the brake pedal 11 into a substantially linear motion of the rod 14, and the other end of the rod 14 engages a first piston 15a of a master cylinder 15 of a tandem type in the direction to force the piston 15a into the master cylinder 15. The master cylinder 15 additionally receives therein a second piston 15b on the side of the first piston 15a facing away from the rod 14, and the first and second pistons 15a and 15b are both resiliently urged toward the rod 14 by respective springs. The brake pedal 11 is also urged by a spring (not shown in the drawing) such that the brake pedal 11 is held at the initial position shown in FIG. 2 by a stopper not shown in the drawing when the brake is not being operated.

The master cylinder 15 is provided with a reservoir tank 16 for receiving and feeding the brake fluid depending on the displacement of the two pistons 15a and 15b. The pistons 15a and 15b are each fitted with seal members to shut oil passages 16a and 16b communicating the interior of the master cylinder 15 with the reservoir tank 16, respectively. Inside the master cylinder 15, a first fluid chamber 17a is defined between the first and second pistons 15a and 15, and a second fluid chamber 17b is defined on the side of the second piston 15b facing away from the first piston 15a.

In addition to the electric servo motor 12, the motor actuated cylinder 13 is provided with a gear mechanism 18 connected to the electric servo motor 12, a screw rod 19 which is connected to the gear mechanism 18 via a ball screw mechanism for an axial movement, and a first piston 21a and a second piston 21b which are connected to the screw rod 19 coaxially and in tandem.

The second piston 21b is fixedly provided with a connecting member 20 projecting toward the first piston 21a, and the other end of the connecting member 20 is connected to the first piston 21a so as to allow a relative axial movement with the first piston 21a to a certain extent. Further, the first and second pistons 21a and 21b are both resiliently urged toward the screw rod 19 by respective springs 27a and 27b. In particular, the spring 27a urges the first and second pistons 21a and 21b away from each other. Thereby, the first piston 21a is able to advance (move toward the second piston 21a) independently from the second piston 21b, but is able to pull the second piston 21b back to the initial position via the connecting member 20 when the first piston 21a retreats.

The motor actuated cylinder 13 is provided with oil passages 22a and 22b which in turn communicate with the reservoir tank 16 via a communication passage 22, and the pistons 21a and 21b are fitted with per se known seal members to shut the oil passages 22a and 22b as required. In the motor actuated cylinder 13, a first fluid pressure generating chamber 23a is defined between the first and second pistons 21a and 21b, and a second fluid pressure generating chamber 23b is defined on the side of the second piston 21b facing away from the first piston 21a.

The first fluid chamber 17a of the master cylinder 15 is communicated with the first fluid pressure generating chamber 23a of the motor actuated cylinder 13 via a normally open solenoid valve 24a, and the second fluid chamber 17b of the master cylinder 15 is communicated with the second fluid pressure generating chamber 23b of the motor actuated cylinder 13 via a normally open solenoid valve 24b by using appropriate tubing. A master cylinder side brake pressure sensor 25a is provided on the line between the first fluid chamber 17a and the solenoid valve 24a, and a motor actuated cylinder side brake pressure sensor 25b is provided on the line between the solenoid valve 24b and the second fluid pressure generating chamber 23b.

A cylinder type simulator 28 is provided on the line between the second fluid chamber 17b and the solenoid valve 24b via a normally closed solenoid valve 24c. The simulator 28 is provided with a cylinder having an interior separated by a piston 28a. A fluid receiving chamber 28b is defined on the side of the piston 28a facing the solenoid valve 24b, and a compression coil spring 28c is interposed between the opposite side of the piston 28a and the opposing axial end of the cylinder of the simulator 28. When the brake pedal 11 is depressed to cause the brake fluid in the second fluid chamber 17b to flow into the fluid receiving chamber 18b while the solenoid valves 24a and 24b are closed and the solenoid valve 24c is open, the biasing force of the compression coil spring 28c is transmitted to the brake pedal 11 so that the vehicle operator is caused to experience a brake pedal reaction from the brake pedal 11 in a similar manner as in the case with the conventional brake system in which the master cylinder and the wheel cylinder are directly connected to each other.

The first fluid pressure generating chamber 23a and second fluid pressure generating chamber 23b of the motor actuated cylinder 13 are communicated with a plurality (four, in the illustrated embodiment) of wheel cylinders 2b, 3b via a VSA system 26 which may consist of a per se known vehicle behavior stabilization control system configured to control an ABS for preventing the locking of wheels at the time of braking, a TCS (traction control system) for preventing the slipping of wheels at the time of acceleration and a side slip control for controlling the side slip of the vehicle at the time of cornering in a coordinated manner. For details of such systems, reference should be made to various prior patent publications on such subject matters. The VSA system 26 includes brake actuators including various hydraulic devices responsible for the control of a first system for the wheel cylinders 2b of the front wheels and a second system for the wheel cylinder 3b of the rear wheels, and a VSA control unit 26a for controlling the various hydraulic devices. The VSA system of the illustrated embodiment is provided with various control functions, but may include only part of such control functions and/or may include other control functions without departing from the spirit of the present invention.

The overall control of the brake fluid pressure generating unit 8 is performed by the control unit 6. The control unit 6 receives the various detection signals from the stroke sensor 11a, the brake pressure sensors 25a and 25b and other sensors (not shown in the drawings) for detecting the behavior of the vehicle. Based on the detection signal from the stroke sensor 11a, and the operating condition of the vehicle that can be determined from the detection signals of the various sensors, the control unit 6 controls the brake fluid pressure generated by the motor actuated cylinder 13. In the case of a hybrid vehicle (or electric vehicle) as is the case with the illustrated embodiment, as the motor/generator provides a regenerative braking, the control unit 6 is configured to control the brake force allocation or control the brake fluid pressure produced by the motor actuated cylinder 13 depending on the extent or magnitude of the regenerative braking.

The mode of control operation during a normal braking is described in the following. FIG. 2 shows the state of the system when the brake pedal 11 is not being operated. The detection value of the stroke sensor 11a is at an initial value (=0), and the control unit 6 does not produce any brake fluid pressure generation signal. At this time, the screw rod 19 of the motor actuated cylinder 13 is in the most retracted position and the two pistons 21a and 21b of the motor actuated cylinder 13 are also in the respective most retracted positions under the spring force of the return springs 27a and 27b so that no brake fluid pressure is produced in either of the fluid pressure generating chambers 23a and 23b.

When the brake pedal 11 is depressed to a certain extent, and the detection value of the stroke sensor 11a has become greater than zero, a brake-by-wire control is performed in such a manner that the two solenoid valves 24a and 24b are closed to prevent the fluid pressure generated by the master cylinder 15 to be transmitted to the motor actuated cylinder 13 and the solenoid 24c is opened to cause the fluid pressure generated by the master cylinder 15 to be transmitted to the simulator 28. Based on the input amount detection value (brake operation amount) detected by the stroke sensor 11a, the control unit 6 determines a target fluid pressure that takes into account the regenerative braking, and forwards a corresponding motor drive command value (operation amount) to the electric servo motor 12. This in turn causes the screw rod 19 and hence the first piston 21a to be pushed out according to this command value, and a brake fluid pressure corresponding to the input or the depression stroke (brake operation amount) of the brake pedal 11 is generated in the first fluid pressure generating chamber 23a. At the same time, the second piston 21b is displaced forward under the pressure in the first fluid pressure generating chamber 23a against the biasing force of the return spring 27b, and the corresponding brake fluid pressure is generated in the second fluid pressure generating chambers 23b.

When the vehicle operator has displaced the brake pedal 11 in the returning direction (or has released the brake pedal), according to the returning stroke of the brake pedal detected by the stroke sensor 11a, the electric servo motor 12 returns the screw rod 19 and hence the first piston 21a towards the initial position such that the brake fluid pressure is diminished by an amount corresponding to the returning stroke or the current depression of the brake pedal 11. When the brake pedal 11 is fully returned to the initial position by the return spring not shown in the drawing, the control unit 6 opens the solenoid valves 24a and 24b. As a result, the brake fluid in the wheel cylinders 2b and 3b is allowed to return to the reservoir tank 16 via the motor actuated cylinder 13 and the braking force is eliminated. As the detected value of the stroke sensor 11a returns to the initial value, the first piston 21a is caused to return to the initial position, and this in turn causes the second piston 21b to return to the initial position owing to the force transmitted via the connecting member 20.

When the normal braking control is performed, the brake fluid pressure generated by the motor actuated cylinder 13 is supplied to the wheel cylinders 2b and 3b of the front and rear wheels via the VSA system 26. When the VSA system 26 performs the braking force distributing control, the braking force of each wheel is individually controlled as commanded by the VSA system 26. When the VSA system 26 is not in operation, the VSA system 26 allows the brake fluid supplied by the motor actuated cylinder 13 to be directly supplied to the wheel cylinders 2b and 3b of the front and rear wheels.

When the regenerative braking is being performed, the control unit 6 causes the motor/generator 5 to operate as a generator such that the amount of the regenerative braking is produced in dependence on the brake operating amount given by the stroke of the brake pedal 11. If the vehicle deceleration commanded by the brake operating amounted (or by the vehicle operator) cannot be produced by the regenerative braking alone, the electric servo motor 12 actuates the motor actuated cylinder 13, and the coordinated combined braking involving both the regenerative braking and the hydraulic braking is performed. In this embodiment, the target brake liquid pressure can be determined by subtracting the regenerative braking force from the total required braking force which is determined by the brake operating amount or the input amount. Alternatively, the operation amount of the motor actuated cylinder may be selected such that a hydraulic braking force corresponding to a certain ratio to the entire required braking force is produced. According to the present invention, this control action may be performed in a per se known manner as long as the operation of the motor actuated cylinder 13 is performed in association with the depression stroke of the brake pedal 11.

The timing of closing the solenoid valve 24c may be selected as the time point at which the fluid pressure of the second fluid chamber 17b has dropped to an adequately low level to cause the piston 28a to return to the initial position illustrated in FIG. 2 under the biasing force of the compression coil spring 28c. For instance, this timing may be selected as the time point when a prescribed time period has elapsed since the two solenoid valves 24a and 24b are closed. It is also possible to select the timing when the detection value of the brake pressure sensor 25b on the side of the motor actuated cylinder 13 has dropped below a prescribed value such as zero.

Figure 3:
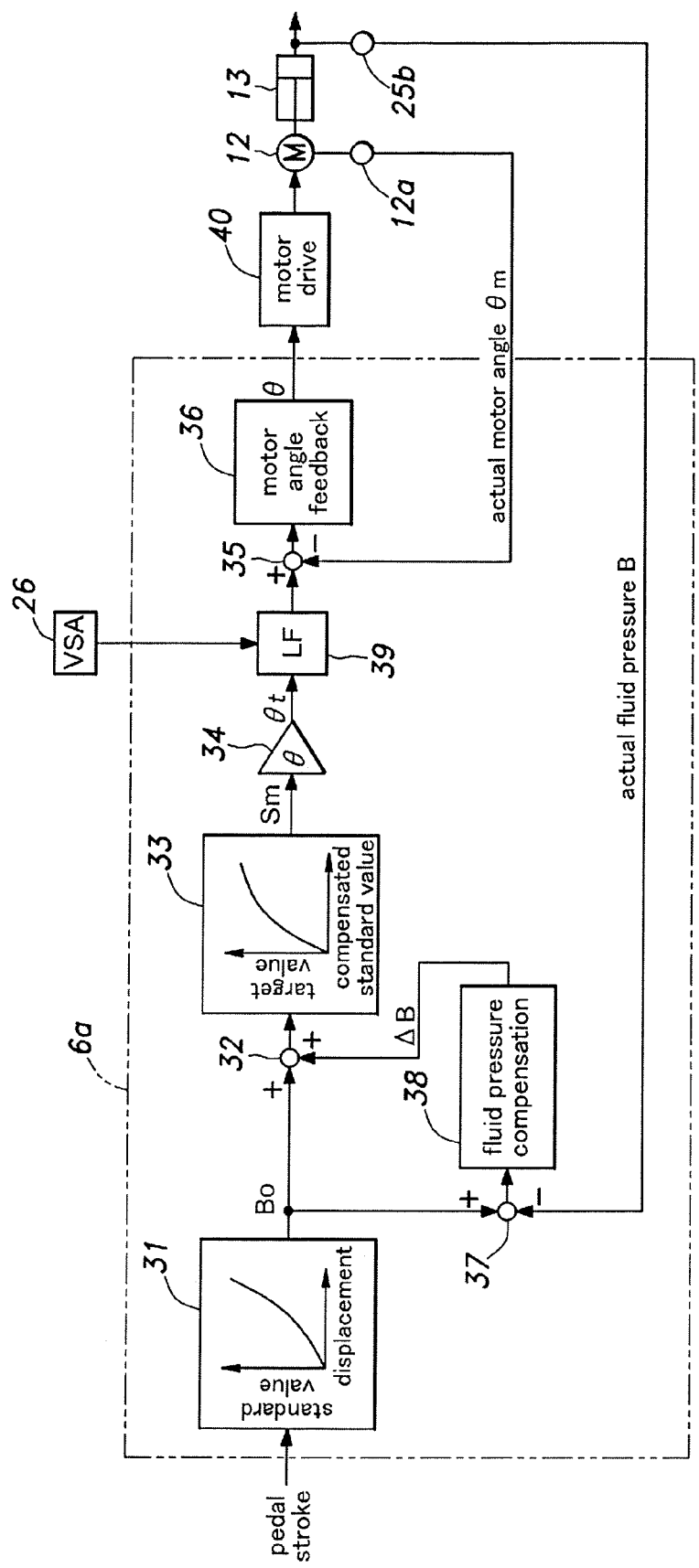
FIG. 3 is a block diagram of a control unit for the vehicle brake system given as a first embodiment of the present invention.

As shown in FIG. 3, the control unit 6 includes a fluid pressure adjust control circuit 6a as a main part thereof. The structure of the fluid pressure adjust control circuit 6a is described in the following with reference to FIG. 3. In the fluid pressure adjust control circuit 6a, the brake input amount (displacement) given by the detection signal of the stroke sensor 11a is forwarded to a brake force standard value setting circuit 31 that provides a standard value B0 representing a target fluid pressure corresponding to the given brake input amount (displacement) by using a map or a mathematical function. The input of the brake force standard value setting circuit 31 may not necessarily consist of the brake pedal stroke, but may also consist of a detectable input amount (such as the fluid pressure given by the brake pressure sensor 25a and the pressure that is applied to the brake pedal 11), or the required braking force given in relation with the regenerative braking force.

The standard value B0 obtained by the brake force standard value setting circuit 31 is forwarded to an adder 32 whose output is connected to a target value setting circuit 33 serving as a means for setting the target operating amount. The target value setting circuit 33 gives a target value Sm or the target operating amount of the electric servo motor 12 for the given input. The target value Sm obtained by the target value setting circuit 33 is forwarded to a motor angle converting unit 34 which converts the target value Sm into a corresponding target motor angle θt. In the circuit shown in FIG. 3, the target value Sm corresponds to the target stroke of the motor actuated cylinder 13, and the target motor angle θt corresponds to the motor angle of the electric servo motor 12 that produces the target stroke of the motor actuated cylinder 13.

The target motor angle θt obtained by the motor angle converting unit 34 is forwarded to a subtractor 35 via a low pass filter switching circuit 39, and the output value of the subtractor 35 is forwarded to a motor angle feedback circuit 36. A motor angle control amount given by the output of the motor angle feedback circuit 36 is used for controlling the rotational angle of the electric servo motor 12 via a motor drive circuit 40, and hence the stroke of the motor actuated cylinder 13 so that the brake fluid pressure corresponding to a brake control amount Bs is produced.

The standard value B0 produced from the brake force standard value setting circuit 31 is also forwarded to a subtractor 37 which also receives the detection signal (actual fluid pressure B) from a brake pressure sensor 25b for detecting the brake fluid pressure generated by the motor actuated cylinder 13 as a feedback value. The output of the subtractor 37 is forwarded to a fluid pressure compensation circuit 38, and the output of the fluid pressure compensation circuit 38 or a compensation value ΔB (=B0−B) is forwarded to the other input of the adder 32. The adder 32 thus adds the compensation value ΔB to the standard value B0, and forwards the sum (B0+ΔB) to the target value setting circuit 33. Thereby, the actual fluid pressure B is properly reflected in the target value Sm obtained by the target value setting circuit 33.

The motor angle of the electric servo motor 12 is detected by a rotational angle sensor (such as a rotary encoder) 12a, and the actual motor angle θm is forwarded to the subtractor 35 as a feedback value. Therefore, the motor angle feedback circuit 36 receives the output (θt−θm) of the subtractor 35, and determines the motor angle control value θ according to the difference (θt−θm) between the target motor angle θt and the actual motor angle θm. The motor angle control value θ is forwarded to the motor drive circuit 40 so that the electric servo motor 12 is controlled by the motor drive circuit 40 according to the motor angle control value θ. In this manner, the stroke of the motor actuated cylinder 13 is controlled as a motor angle feedback control of the electric servo motor 12.

In the arrangement shown in FIG. 3, the low pass filter switching circuit 39 receives a VSA operation signal when the VSA system 26 is activated. The low pass filter switching circuit 39 performs a filtering operation with a prescribed cut off frequency when a VSA signal is being supplied thereto, and does not perform any filtering operation when a VSA signal is not supplied thereto by allowing the signal pass therethrough without any filtering action.

When the VSA system 26 is in operation, an assisting brake fluid pressure is generated in the part of the brake fluid hydraulic system downstream to the motor actuated cylinder 13, separately from the brake fluid pressure generated by the motor actuated cylinder 13. More specifically, referring to FIG. 2, when the VSA system 26 is in operation, the brake fluid pressure may be reduced by releasing the brake fluid to a low pressure reservoir 26c via a normally closed "out valve" (depressurizing valve) 26b, or may be increased by forwarding the brake fluid pressurized by a motor pump 26d to the wheel cylinders 2b, 3b via a normally open "in valve" (pressurizing valve) 26e. At such a time, owing to the movement of the brake fluid in the line leading to the wheel cylinders 2b, 3b and the operation of a regulator valve 26f used by the VSA system 26, the actual fluid pressure B detected by the brake pressure sensor 25b may vary. This affects the brake fluid pressure generated for the given stroke of the motor actuated cylinder 13, and this in turn causes the motor angle control amount θ produced by the motor angle feedback circuit 36 to deviate from the original value. If this deviation is excessively compensated by the motor actuated cylinder 13, the responsiveness of the fluid pressure control by the VSA system 26 may be adversely affected.

According to the illustrated embodiment, when the VSA system 26 is in operation, the output signal of the motor angle converting unit 34 is passed through the low pass filter switching circuit 39 so that the input signal to the subtractor 35 is given with a certain phase delay determined by the cut-off frequency thereof. Thereby, the motor angle control is restricted, and the piston stroke of the motor actuated cylinder 13 is hence favorably controlled so that the fluid pressure responsiveness of the VSA system 26 is ensured.

When the VSA system is not in operation, the low pass filter switching circuit 39 is disabled, and the output signal of the motor angle converting unit 34 is directly forwarded to the subtractor 35 so that the motor angle control is performed in a highly responsive manner, and the piston stroke of the motor actuated cylinder 13 is allowed to change at the original brisk rate.

Figure 4:
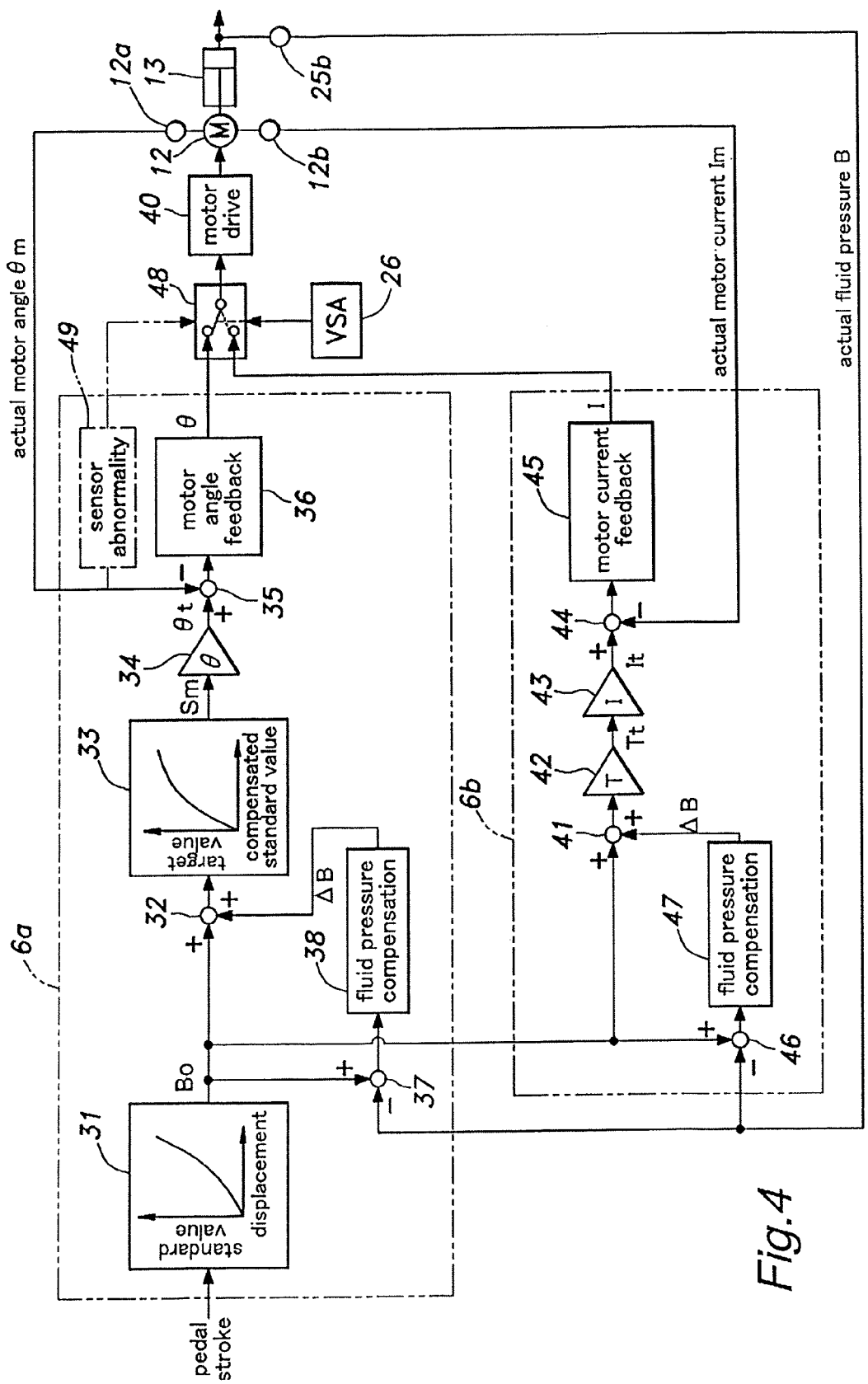
FIG. 4 is a view similar to FIG. 3 showing a second embodiment of the present invention.

A second embodiment of the present invention is described in the following with reference to FIG. 4. In FIG. 4, the parts corresponding to those shown in FIG. 3 are denoted with like numerals without repeating the description of such parts. The control unit 6 of the second embodiment includes a fluid pressure adjust control circuit 6a similar to that of the previous embodiment and a torque control circuit 6b which is connected in parallel with the fluid pressure adjust control circuit 6a. In this case, the low pass filter switching circuit 39 connected to the VSA system 26 is absent, and the output of the motor angle converting unit 34 is directly connected to the subtractor 35.

The torque control circuit 6b includes an adder 41 having a first input receiving the standard value B0, a torque converting unit 42, a current converting unit 43, a subtractor 44 and a motor current feedback circuit 45 which are connected in series in this order. The standard value B0 is also supplied to an input of another subtractor 46 whose other input receives the actual brake fluid pressure B as a feedback value, and the output of the subtractor 46 is forwarded to a liquid pressure compensating circuit 47. The compensation value ΔB (=B0− B) produced from the liquid pressure compensating circuit 47 is forwarded to the other input of the adder 41 which forwards the sum (B0+ΔB) of the standard value B0 and the compensation value ΔB to the torque converting unit 42. Thereby, the actual fluid pressure B is reflected in the target torque Tt obtained by the torque converting unit 42.

The target torque Tt obtained by the torque converting unit 42 is converted into a target electric current It corresponding to the target torque Tt by the current converting unit 43, and the target electric current It is forwarded to the input of the subtractor 44. The motor current of the electric servo motor 12 is detected by a current sensor 12b, and the actual motor current Im detected by the current sensor 12b is forwarded to the other input of the subtractor 44 as a feedback value. Thus, the motor current feedback circuit 45 receives the output value (It−Im) of the subtractor 44 as a control input, and provides the motor current control amount I according to the difference (It−Im) between the target motor current It and the actual motor current Im.

The motor angle control amount θ produced from the motor angle feedback circuit 36 and the motor current control amount I produced from the motor current feedback circuit 45 are forwarded to a pair of selection terminals of a switching unit 48 consisting of a two position selector switch. The switching unit 48 is configured to be operated by the VSA operation signal supplied from the VSA system 26 when the VSA system 26 is put into operation.

When the VSA system 26 is not in operation, the switching unit 48 is in the position to cause the motor angle control amount θ to be supplied to the motor drive circuit 40 so that the motor angle feedback control is performed as in the first embodiment. On the other hand, when the VSA system 26 is in operation, the switching unit 48 is switched over as indicated by the imaginary line in FIG. 4 so that the motor current control amount I is supplied to the motor drive circuit 40. Therefore, in the latter case, the electric servo motor 12 is controlled by a motor current feedback control or a motor torque feedback control.

On the other hand, when the VSA system is not in operation, the control unit 6 selects the motor angle feedback control which is based on the displacement of the piston stroke of the motor actuated cylinder 13. In this case, because the VSA system 26 is not in operation and does not cause any changes in the loss property of the hydraulic system for the brake system, the brake system may be operated with a high responsiveness based on the motor angular position which allows the actual brake fluid pressure to accurately track the target brake fluid pressure.

Optionally, the fluid pressure adjust control circuit 6a may be provided with a sensor abnormality detection circuit 49 to detect an event where the rotational angle sensor 12a produces an abnormal detection value due to noises or a fault in the sensor (as indicated by the imaginary line in FIG. 4). In the event of detecting an abnormal detection value, the sensor abnormality detection circuit 49 forwards a sensor abnormal detection signal to the switching unit 48 so that the motor current feedback control may be performed as in the case where the VSA system 26 is in operation. Thereby, in the event of detecting an abnormal motor angle due to noises or sensor failures, the brake system is allowed to operate in an adequately stable manner.

Although the present invention has been described in terms of a preferred embodiment thereof, it is obvious to a person skilled in the art that various alterations and modifications are possible without departing from the scope of the present invention which is set forth in the appended claims.

For instance, the first embodiment may be modified by replacing the fluid pressure adjust control circuit 6a with the torque control circuit 6b and adding the low pass filter switching circuit 39 to the output of the motor angle converting unit 34 of the torque control circuit 6b.

The present invention is most advantageously used in brake-by-wire brake systems which combine the hydraulic braking and the regenerative braking in an intelligent manner, but also to more conventional brake-by-wire systems using only the hydraulic braking.

The contents of the original Japanese patent application on which the Paris Convention priority claim is made for the present application as well as the contents of the prior art references mentioned in this application are incorporated in this application by reference.

The invention claimed is:

1. A vehicle brake system, comprising:
   an input amount sensor for detecting an input amount applied to a brake pedal;
   a motor actuated cylinder configured to be actuated by an electric motor for producing a brake fluid pressure in dependence on a control input thereof;
   a wheel cylinder that produces a braking force according to the brake fluid pressure supplied thereto by the motor actuated cylinder;
   a feedback control unit including a target setting unit for setting a target operation amount of the motor actuated cylinder according to the input amount applied to the brake pedal, an operation amount sensor for detecting an actual operation amount of the motor actuated cylinder and a feedback unit for providing the control input for the motor actuated cylinder so as to minimize a deviation between the target operation amount and the actual operation amount; and
   a response restricting unit for restricting a response property of the feedback control unit when a prescribed condition is met,
   wherein the feedback control unit comprises a first feedback control unit using a first parameter representing a stroke of the motor actuated cylinder as the target operation amount and a second feedback control unit using a second parameter representing a drive force of the motor actuated cylinder as the target operation amount, and the response restricting unit comprises a switching unit for controlling the motor actuated cylinder by using the first feedback control unit when the prescribed condition is not met and the second feedback control unit when the prescribed condition is met.

2. The vehicle brake system according to claim 1, wherein the prescribed condition is met when an extraneous brake fluid control operation is detected.

3. The vehicle brake system according to claim 2, wherein the extraneous brake fluid control operation comprises a reduction in the fluid pressure of the wheel cylinder.

4. The vehicle brake system according to claim 2, wherein the extraneous brake fluid control operation comprises an increase in the fluid pressure of the wheel cylinder.

5. The vehicle brake system according to claim 1, further comprising a sensor abnormality detection circuit, the response restricting unit restricting a response property of the feedback control unit when an abnormal condition of a sensor is detected by the sensor abnormality detection circuit.

6. The vehicle brake system according to claim 1, further comprising a brake fluid pressure sensor for detecting the brake fluid pressure and a brake fluid pressure compensating unit for compensating the input amount according to the detected brake fluid pressure.

7. The vehicle brake system according to claim 1, wherein:
   the electric motor is an electric servo motor; and
   the operation amount sensor includes a rotational angle sensor that detects a motor angle of the electric servo motor as the first parameter and a current sensor that detects a motor current of the electric servo motor as the second parameter.

* * * * *